United States Patent [19]
Cook

[11] 4,177,763
[45] Dec. 11, 1979

[54] CAT SCRATCHING POST ASSEMBLY

[76] Inventor: Weldon R. Cook, 30700 Manzano Dr., Malibu, Calif. 90265

[21] Appl. No.: 896,892

[22] Filed: Apr. 17, 1978

[51] Int. Cl.² ............................................. A01K 15/00
[52] U.S. Cl. ...................................... 119/29; 248/158
[58] Field of Search ............................ 119/29, 29.5, 1; 248/158, 159, 188.1, 165, 529

[56] References Cited

U.S. PATENT DOCUMENTS

| | | | |
|---|---|---|---|
| 2,894,487 | 7/1959 | Goldson | 119/29.5 X |
| 3,479,990 | 11/1969 | Crow | 119/1 |
| 3,716,029 | 2/1973 | Pillsbury, Jr. | 119/29 |
| 4,112,873 | 9/1978 | Van Zandt | 119/29 |

Primary Examiner—Hugh R. Chamblee
Attorney, Agent, or Firm—Keith D. Beecher

[57] ABSTRACT

A scratching post assembly is provided for cats, and other pets, which comprises an upright elongated post which is covered with carpeting, or equivalent material, and which is detachably mounted on a base which, likewise, may be covered with carpeting, or equivalent material. In accordance with the invention, the post is readily demountable from the base, and the base is formed of two hinged sections which may be folded against one another, so that the assembly may be packaged to occupy minimal space for shipping purposes and for display in retail outlets.

4 Claims, 3 Drawing Figures

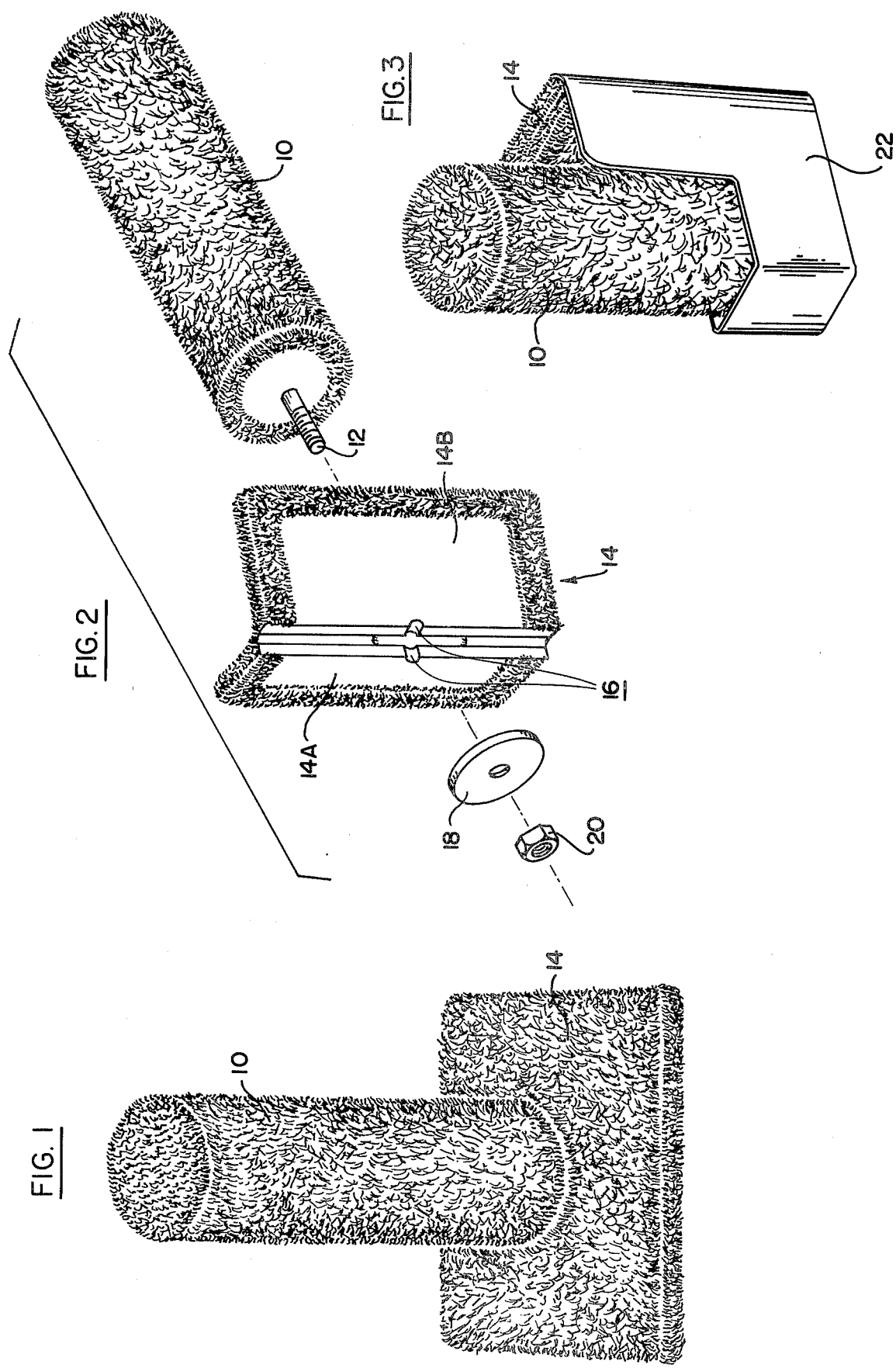

CAT SCRATCHING POST ASSEMBLY

BACKGROUND OF THE INVENTION

Scratching posts have substantial utility about the house, since they encourage cats and other pets to scratch the posts, instead of furniture and fixtures. However, in order to be feasible, a scratching post must have a relatively large base, so that there will be no tendency for the structure to tip over when scratched by large cats, or other pets.

However, the aforesaid requirement for a large base has created packaging problems in the prior art scratching post assemblies, since the overall shape of the prior art assembly is awkward to package, and since the prior art assemblies require an inordinately large amount of space for display purposes in the retail outlets.

These problems are solved by the structure of the present invention because, as will be described, the scratching post of the invention may be readily dismantled from the base, and the base may be folded into a shape requiring minimal space for convenient packaging and display purposes.

In the embodiment to be described, the scratching post assembly of the invention has a base which may be readily disconnected from the post itself, and then folded, so that the post and folded base may be packaged adjacent to one another, with the resulting package having relatively small dimensions. The carpet covering the base preferably serves as the hinge, so that the assembly can be produced inexpensively and sold at a relatively low price.

BRIEF DESCRIPTION OF THE DRAWING

FIG. 1 is a perspective representation of a scratching post assembly constructed in accordance with one embodiment of the invention;

FIG. 2 is an exploded perspective view of the assembly of FIG. 1; and

FIG. 3 shows the assembly of FIG. 1 in a dismantled condition, and packaged in a conveniently shaped package for shipping and display purposes.

DETAILED DESCRIPTION OF THE ILLUSTRATED EMBODIMENT

As shown in the drawing, the assembly of the invention includes an elongated post 10 having a threaded stud 12 protruding from the lower end thereof. The assembly also includes a base 14 which is formed of a first planar section 14a and a second planar section 14b. The post and the base are covered with appropriate carpeting material, or other appropriate material, which is conducive to causing the cat, or other household paet, to scratch the post and the base.

The carpeting material on the base has an additional function of serving as a hinge for the two sections 14a and 14b. This hinge permits the two sections to be turned to a coplanar position, such as shown in FIG. 1, or to a folded position such as shown in FIG. 3. A central hole 16 is formed on the hinge line between the two sections 14a and 14b. This hole 16 receives the stud 12 which the assembly is assembled, and an apertured plate 18 receives the stud and bears against the lower surface of the base 14.

A nut 20 is threaded to the stud to hold the post 10 in place on the base 14. The lower end of the post bears against one side of the base sections 14a and 14b, and the plate 18 bears gainst the other side, so that when the nut 20 is tightened, the base sections are firmly and securely held in their coplanar position as shown in FIG. 1.

For shipping purposes, the post is removed from the base, and the plate 18 and nut 20 are held on the stud 12. The base 14 is folded, and the post and base may be packaged in a suitable package 22 with the post in front of the folded base, for shipping and display purposes. It will be observed that the dismantled assembly is compactly packaged within the package 22, for convenient shipping and display purposes.

It will be appreciated that while a particular embodiment of the invention has been shown and described, modifications may be made, and it is intended in the claims to cover all modifications which come within the true spirit and scope of the invention.

What is claimed is:

1. A scratching post assembly for cats, and other household pets, comprising: an elongated post; carpeting material covering said post; a stud protruding downwardly from the lower end of said post; a two-piece base comprising a first planar section and a second planar section having edges adjacent to one another; carpeting material covering said base and causing the adjacent edges of said first and second planar sections to be hinged to one another so as to permit the base to be closed to a first position in which the first and second sections are folded against one another, and to be opened to a second position in which the first and second sections are in co-planar relationship with respect to one another, said first and second sections defining a hole on the hinge line for receiving said stud; and fastening means engaging said stud on the opposite side of the base from the post to secure the post in an upright position on the base and to cause the post to hold the first and second sections of the base in their co-planar relationship.

2. The scratching post assembly defined in claim 1, in which the stud is threaded, and in which said fastening means comprises a nut adapted to be threaded to the stud.

3. The scratching post assembly defined in claim 1, and which includes an aperture plate number adapted to fit over the stud and to be interposed between the fastening means and the lower surface of the base.

4. The scratching post assembly defined in claim 1, in which said hole is located at a central position along the hinge line.